United States Patent [19]

Gordon et al.

[11] Patent Number: 4,602,341
[45] Date of Patent: Jul. 22, 1986

[54] SHARED DATA LOGGER CONTROLLER AND METHOD

[75] Inventors: Richard S. Gordon, Schenectady; Charles L. Devlin, Ballston Lake; Mark W. Durling, Scotia, all of N.Y.

[73] Assignee: General Electric Company, Schenectady, N.Y.

[21] Appl. No.: 533,138

[22] Filed: Sep. 16, 1983

[51] Int. Cl.⁴ .............................................. G06F 15/56
[52] U.S. Cl. ................................... 364/494; 364/492; 290/40 R
[58] Field of Search ................... 364/492, 494; 60/660, 60/662; 290/40 R, 40 B, 40 C; 415/17

[56] References Cited

U.S. PATENT DOCUMENTS

| 4,204,249 | 5/1980 | Dye et al. | 364/492 |
| 4,209,831 | 6/1980 | Ross | 364/492 |
| 4,280,060 | 7/1981 | Kure-Jensen et al. | 290/40 R |

FOREIGN PATENT DOCUMENTS

| 0068994 | 1/1983 | European Pat. Off. | 364/494 |
| 0161962 | 10/1982 | Japan | 364/494 |

OTHER PUBLICATIONS

"A Power Plant Supervisory Control System" by Morita et al., *Hitachi Review*, pp. 217–222, Apr. 1979, Japan.

*Primary Examiner*—Parshotam S. Lall
*Attorney, Agent, or Firm*—Paul Checkovich; Jerome C. Squillaro

[57] ABSTRACT

A method and apparatus to control the flow of data from a plurality of independent turbine-generator data sources includes converting each serial stream of data from each source into parallelly formatted digital characters. These characters are stored in a dedicated buffer. When the buffer is full or when a specified time lapses for each partially filled buffer, the buffer is emptied through a parallel to serial converter into the data logger.

11 Claims, 8 Drawing Figures

FIG. 1
HARDWARE ARCHITECTURE

FIG. 3c

FIG. 4
OUTPUT HANDLER TASK FLOW

FIG. 5
EXECUTIVE PROGRAM

SHARED DATA LOGGER CONTROLLER AND METHOD

BACKGROUND OF THE INVENTION

This invention relates in general to a controller which channels the flow of turbine-generator data from a plurality of turbine-generator data sources into a single data logger or line printer.

To control a steam turbine-generator unit, many process variables, operating parameters, turbine-generator operator instructions and control variables are monitored and assessed by the relatively automatic turbine-generator control system and system operators. The introduction of computers into this complex arrangement has, in one sense, eased the burden on the turbine-generator operators. However, there exists a greater necessity to accurately record the various parameters involved in the operation of the turbine-generator system. With the utilization of a computer-based control system, the recordation of the data is accomplished by a data logger or line printer. Since there are a number of turbine-generator data sources, it is not feasible to tie a separate data logger to each turbine-generator data source. Nor is it feasible to control and coordinate the transmission of data at each data source and utilize only a single data logger for recordation purposes.

The data is sent at an established transmission rate by each source in discrete bursts of digital characters, i.e., the segments of data are sent with inactive times separating these segments. Also, some data sources generate a data stream at a higher or faster rate of transmission than the other data sources.

OBJECTS OF THIS INVENTION

It is an object of this invention to provide for a method of controlling and channeling the flow of data into a shared data logger and provide for a controller to facilitate such control which does not require the data, sent by each turbine-generator data source, to be preprocessed in any fashion by each individual turbine-generator data source.

It is another object of the present invention to provide for a method of sharing a data logger wherein the rates of data transmission from the various turbine-generator sources may be different.

SUMMARY OF THE INVENTION

The method of channeling and controlling the flow of data into a shared data logger includes the step of converting the serially formatted digital characters, sent by each independent turbine-generator data source, into parallelly formatted digital characters with correspondingly independent conversion means. Each conversion means is assigned a priority level based upon the relative criticality of its corresponding data source. An empty data storage buffer, from a queued-up plurality of buffers, is dedicated to each conversion means. Each converted character is stored in the dedicated buffer in accordance ith the relative priority of the conversion means. When the dedicated buffer is filled with parallelly formatted digital characters, another buffer from the queue is substituted therefor. The filled buffers are emptied through a parallel to serial conversion means into the data logger. When the buffer is empty, it is returned to the queue.

A provision may be included to input an identification character into each dedicated storage buffer which identifies the particular turbine-generator data source tied to a particular conversion means. Also, the lapse of time between the storage of one converted character into the dedicated buffer and the conversion of the next serially formatted digital character sent by the corresponding data source is determined for each conversion means. When the lapsed time exceeds a predetermined timeout period associated with each conversion means, the partially full, dedicated buffer is emptied through the parallel to serial conversion means to the data logger.

The shared data logger controller includes a separate conversion means tied to each separate turbine-generator data source, a plurality of empty data storage buffers set up in a linked list to form a queue, an output conversion means with its output tied to the data logger, and a microprocessor tied to each conversion means, to all the buffers and to the output conversion means. The microprocessor controls the flow of data from each conversion means by dedicating buffers, storing the characters, substituting empty buffers for filled buffers, emptying the buffers through the output conversion means into a data logger and returning the empty buffers.

BRIEF DESCRIPTION OF THE DRAWINGS

The present invention will be better understood and further objects gleaned from the detailed description and the illustrations accompanying them in which.

DETAILED DESCRIPTION

The shared data logger controller operates on the flow of digital information and channels data into a single data logger or line printer. There is an intimate mix of instructions and hardware which control the flow of data from a number of turbine-generator data sources into the data logger.

Figure 1:
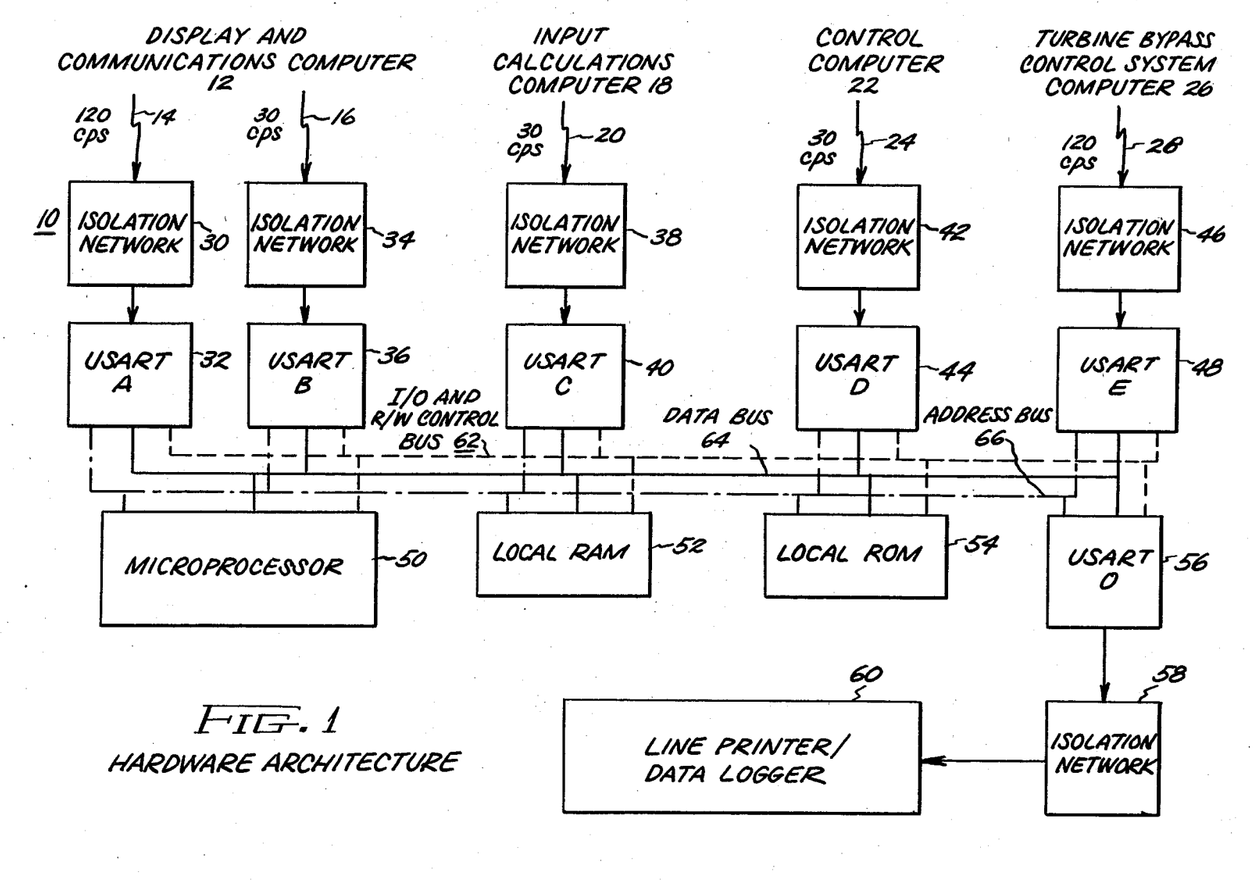
FIG. 1 illustrates, in block diagram form, the hardware architecture for the shared data logger controller.

FIG. 1 illustrates, in block diagram form, the hardware architecture of the shared data logger controller 10. Various turbine-generator data sources are listed across the top of FIG. 1. The display and communications computer 12 supplies two substantially independent and separate streams of serially formatted digital characters through data source lines 14 and 16 to shared data logger controller 10. The display and communications computer may be part of a dedicated microcomputer-based control system for steam turbine-generators as disclosed in U.S. Pat. No. 4,280,060, to Kure-Jensen et al., which disclosure is incorporated herein by reference thereto. Generally, computer 12 displays the various operating conditions of the turbine-generator system and allows the operator of the turbine-generator system to communicate with the balance of the control system.

Line 14 carries discrete bursts of serially formatted digital characters at a high or fast transmission rate. The exemplary rate herein is 120 characters per second (hereinafter designated as 120 cps). Line 16 ties computer 12 with controller 10 and carries discrete bursts of serially characters at an exemplary transmission rate of 30 cps. As used herein, the transmission rate refers to the number of characters per time unit in a particular discrete burst of data. Although each data source generates a stream of data, the stream is made of discrete bursts of data; hence there are time periods when the data source is not transmitting information and those periods segregate the bursts of data. It is understood that each burst need not be uniform in length; hence the amount of information transmitted in each burst varies.

Input calculations computer 18 is tied to controller 10 by line 20 which handles characters at an illustrated transmission rate of 30 cps. A control computer 22 is tied to controller 10 by line 24 which carries serial digital characters at a rate of 30 cps. The interaction and the specific functions of computer 12, computer 18, and computer 22 are described in detail in the Kure-Jesen et al., patent. Computers 12, 18 and 22 supply substantially independent streams of data representative of the operating conditions of the turbine-generator system.

A turbine bypass control system computer 26 is tied to controller 10 by line 28. Computer 26 generates serially formatted digital characters at a rate of 120 cps. Computers 12, 18, 22 and 26 all generate streams of data relatively concurrently with respect to each other.

Each line is connected through an isolation network to a conversion means which in FIG. 1 is designated as an "USART". As is well known in the art, a "USART" is a Universal Asynchronous Receiver Transmitter which converts serial characters into parallel characters or parallel into serial characters. Line 14 is tied to isolation network 30. The isolation network conditions the data signal with filters and amplifiers and, in this example, changes a 24 volt signal to a 5 volt signal, the latter signal being compatible with the digital equipment used herein. The data stream conditioned by isolation network 30 is supplied to conversion means 32, USART A. Device 32, or USART A, converts the serially formatted digital characters from computer 12 into parallelly formatted digital characters at its output. USART A is set to convert characters at a transmission rate of 120 cps.

Isolation network 34 has its input tied to line 16 from computer 12 and its output tied to conversion means 36 or USART B. USART B is set to convert serial characters into parallel characters at a rate of 30 cps. Line 20 is tied to isolation network 38 and conversion means 40, or USART C which converts the characters sent by computer 18. Line 24 supplies serial characters to isolation network 42 and ultimately those serial characters are converted into parallel characters by conversion means 44, USART D. Turbine bypass control system computer 26 is tied through isolation network 46 to conversion means 48, USART E.

It is to be understood that although a single line is shown tying the various data sources to their individual isolation networks and USARTs, these lines are illustrative only and may represent a plurality of data lines, control leads and other electrical connections well known to those of ordinary skill in the art.

A microprocessor 50 cooperates with a local RAM 52, commonly recognized as a random access memory device, and a local ROM 54, which is commonly recognized as a read only memory device. An output conversion means 56, herein designated as USART O, has its output tied to an isolation network 58. Isolation network 58 operates in a similar fashion to isolation networks 30, 34, 38, 42 and 46. The output of isolation network 58 is tied to the input of a line printer/data logger 60.

The representation in FIG. 1 of the connections between USARTs A, B, C, D and E; between microprocessor 50, local RAM 52, local ROM 54; and USART O are only illustrtive of a plurality of electrical interconnections. Generally, the microprocessor controls all data processing and handling activities between these various elements. Hence, the microprocessor utilizes an input/output and read/write control bus 62 (herein illustrated as "I/O and R/W control bus 62") to control the functioning of USARTs A, B, C, D, E and O, and local RAM 52 and local ROM 54. Bus 62 is represented as a dashed line in FIG. 1 tying those components together.

Once a particular control function has been activated, microprocessor 50 informs the selected device of the location of the data to be acted upon, i.e., the address of the data, and then provides that device with the actual data. Hence, the hardware devices are tied to a data bus 64 and an address bus 66. As is well known and recognized in the art, microprocessor 50 provides device selection and data selection thereby controlling USART A, B, C, D, E and O, local ROM and local RAM. Control bus 62, data bus 64, and address bus 68 may include more than one line or the buses may be combined together depending upon the particular configurations and operating compatibility of the USARTs, the microprocessor and its associated RAM and ROM. The microprocessor, in this example, is an Intel 8085, manufactured by Intel Corporation of California, and four Intel 8059A priority interrupt controllers made by the same company.

Figure 2:
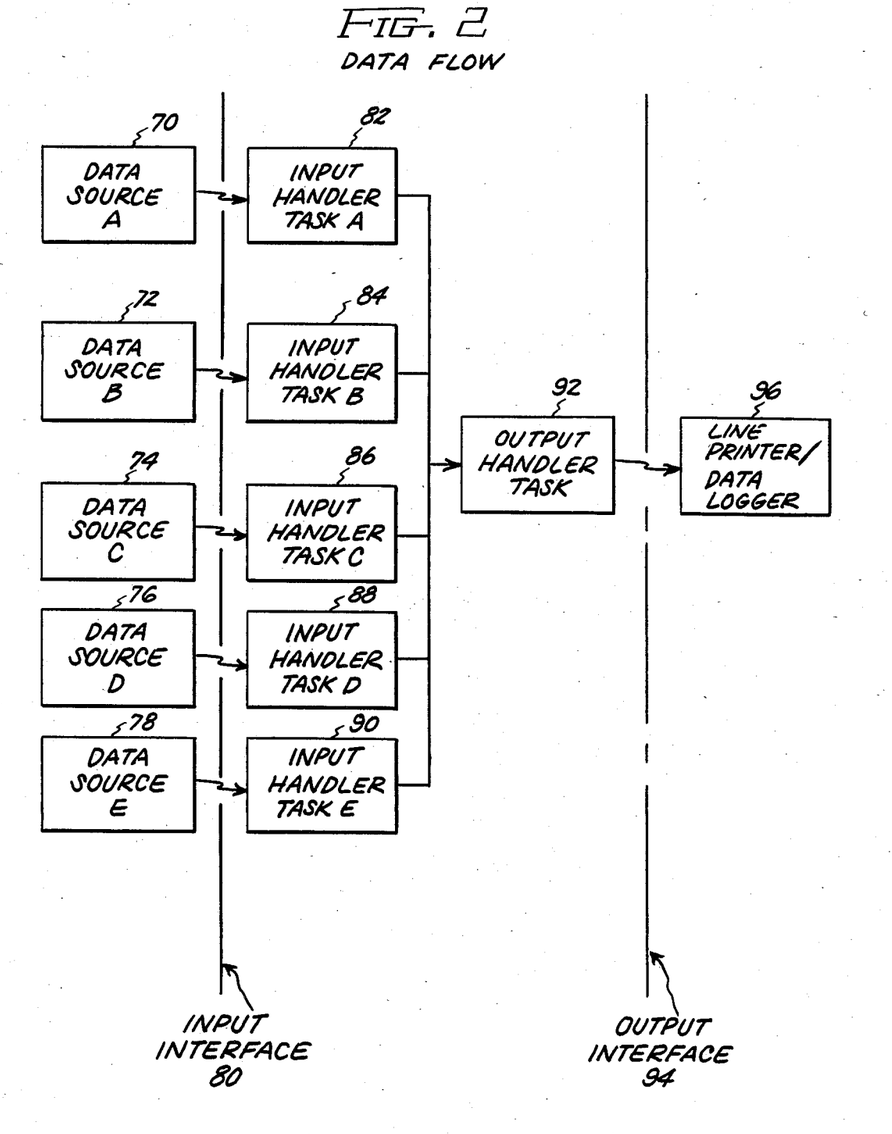
FIG. 2 illustrates the data flow diagram for the shared data logger controller.

FIG. 2 is the data flow diagram for controller 10. In the example discussed herein, data sources A, B, C, D and E represent substantially independent, multiple turbine-generator data sources corresponding to the sources tied to lines 14, 16, 20, 24, 28, respectively in FIG. 1. Hence, data source A, labeled item 70 in FIG. 2, corresponds to line 14 from computer 12 as illustrated in FIG. 1. In a similar fashion, data source B, item 72, is representative the source tied to line 16; data source C, item 74, corresponds to computer 18; data source D, item 76, corresponds to computer 22; and data source E, item 78, corresponds to the data source of turbine bypass control system computer 26.

The various streams of serially formatted digital characters pass through an input interface 80 which conditions the data signals and converts those signals into parallelly formatted digital characters which can be handled by the microprocessor and associated hardware. As is well known in the art, microprocessor 50 simply executes established steps in sequential time. These steps, when joined together form a computer program or computer routine, are termed herein as "tasks". These tasks are stored either in the local ROM 54 or in the microprocessor itself.

The data is processed by microprocessor 50 executing a separate input handler task corresponding to each data source. In this manner, data source A is intimately related by hardware and software to input handler task A, illustrated as item 82. Input handler task B, item 84, is intimately associated with data source B; as is input handler task C, item 86, related to data source C; input handler task D, item 88, corresponds to data source D; and input handler task E, item 90, is associated with data source E. The data flow generated by each data source would be processed by its respective input handler task substantially and relatively independent of the other input handler tasks, and ultimately data flow generated by each data source is processed by output handler task 92 and delivered through output interface 94 to line printer or data logger 96. The separate execution of input handler task A from all other tasks reduces the total amount of memory needed in local RAM 52 and local ROM 54.

Output interface 94 includes USART O and isolation network 58 as shown in FIG. 1. As is well known in the art, the microprocessor executes instructions and handles data flow at a much faster rate than the transmission of data and the conversion of data. Hence, the microprocessor performs a multitasking operation and controls the flow of data from a number of data sources without the loss of digital information from those various data sources.

Figure 3A:
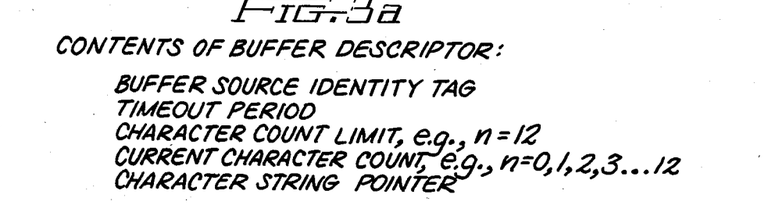
FIGS. 3a, 3b, 3c and 3d show the contents of a buffer descriptor, and the flow chart for an input handler task, respectively.
Figure 3B:
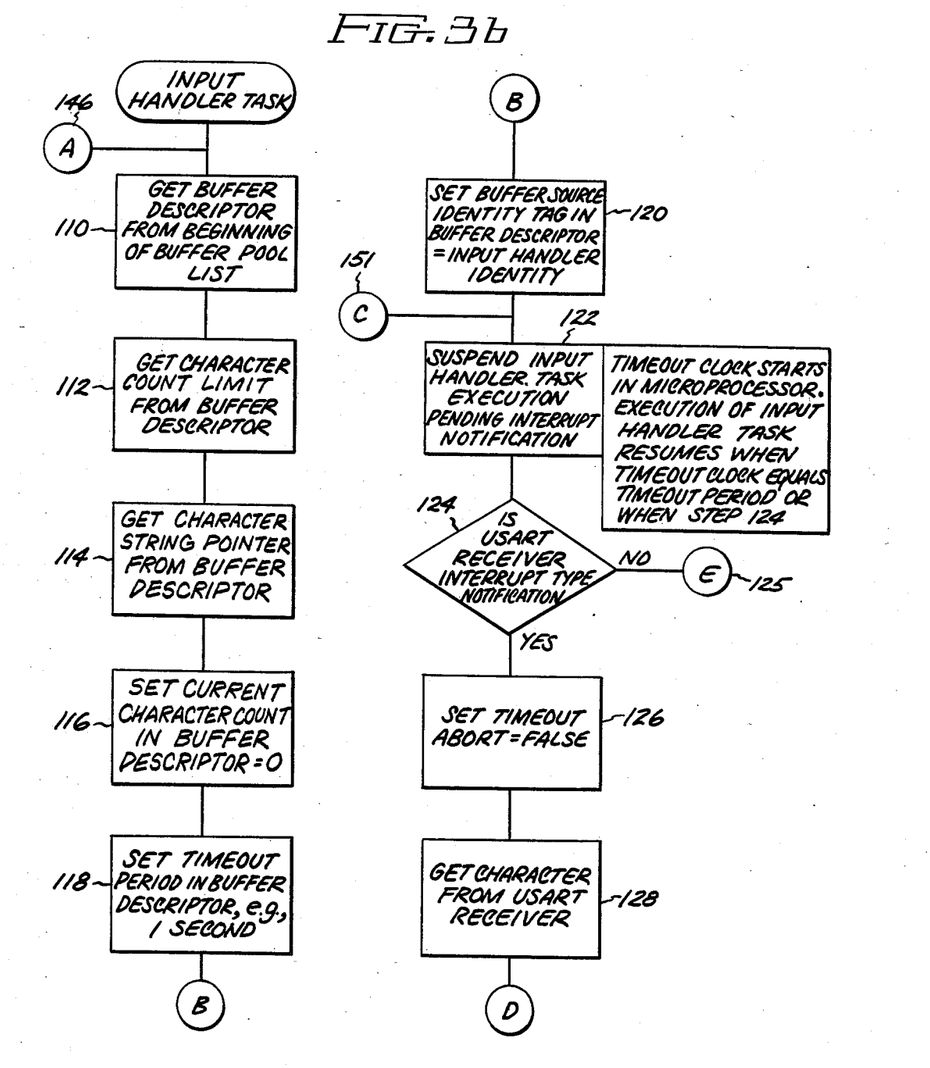
Figure 3C:
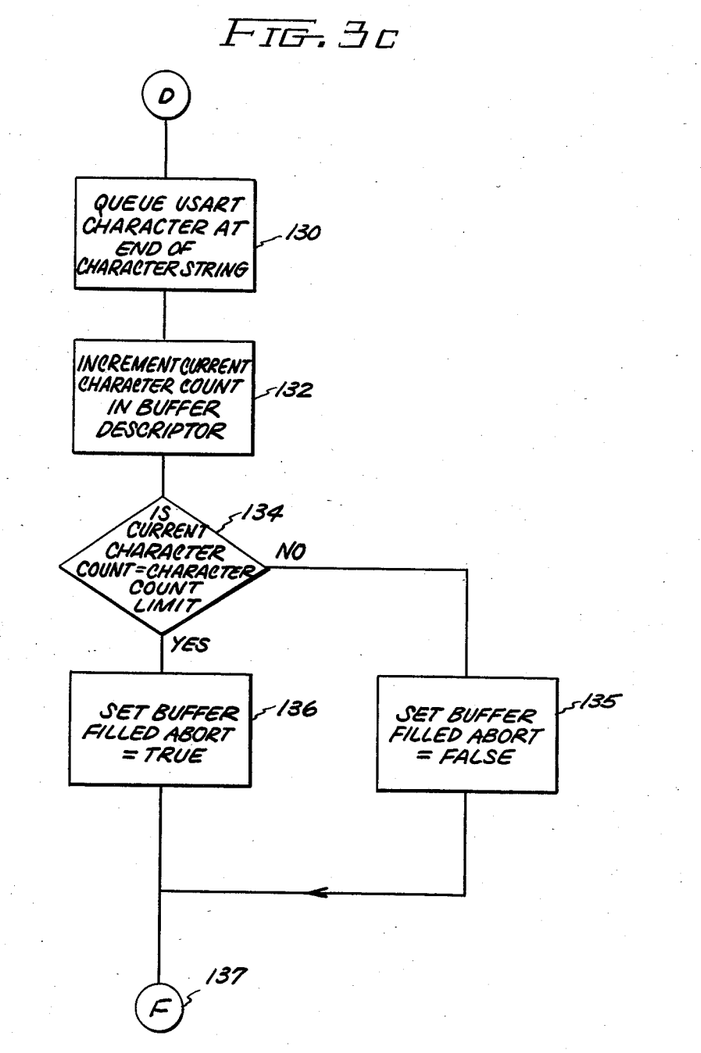
Figure 3D:
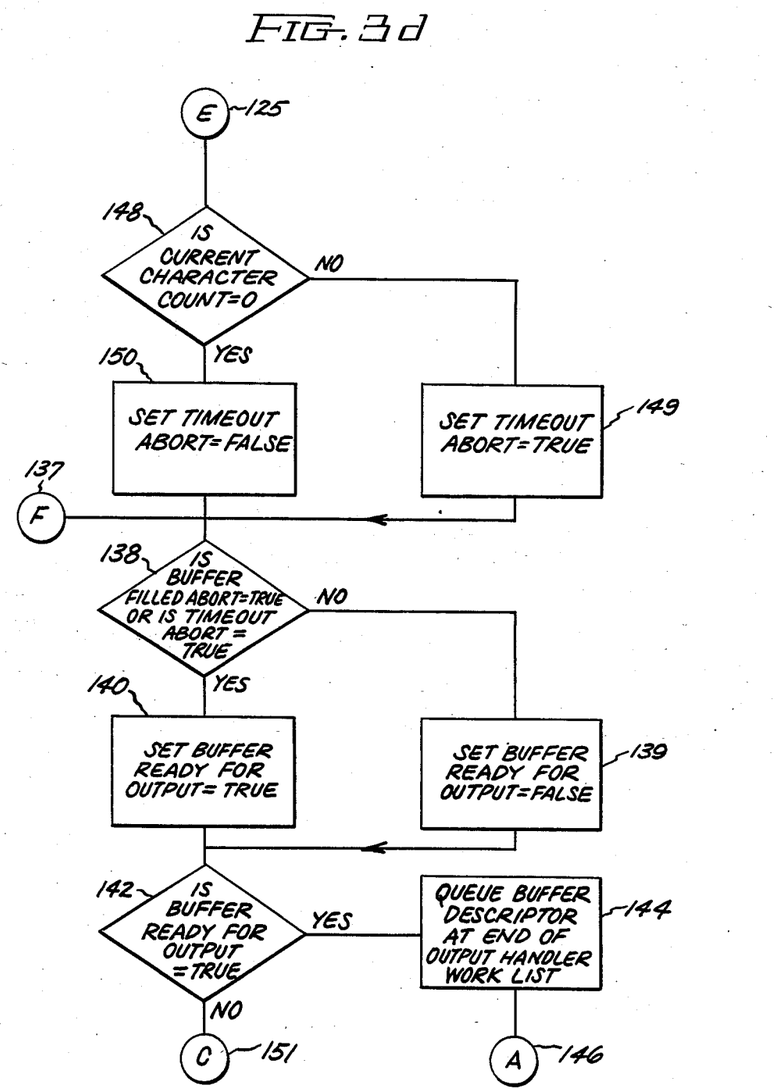
Figure 4:
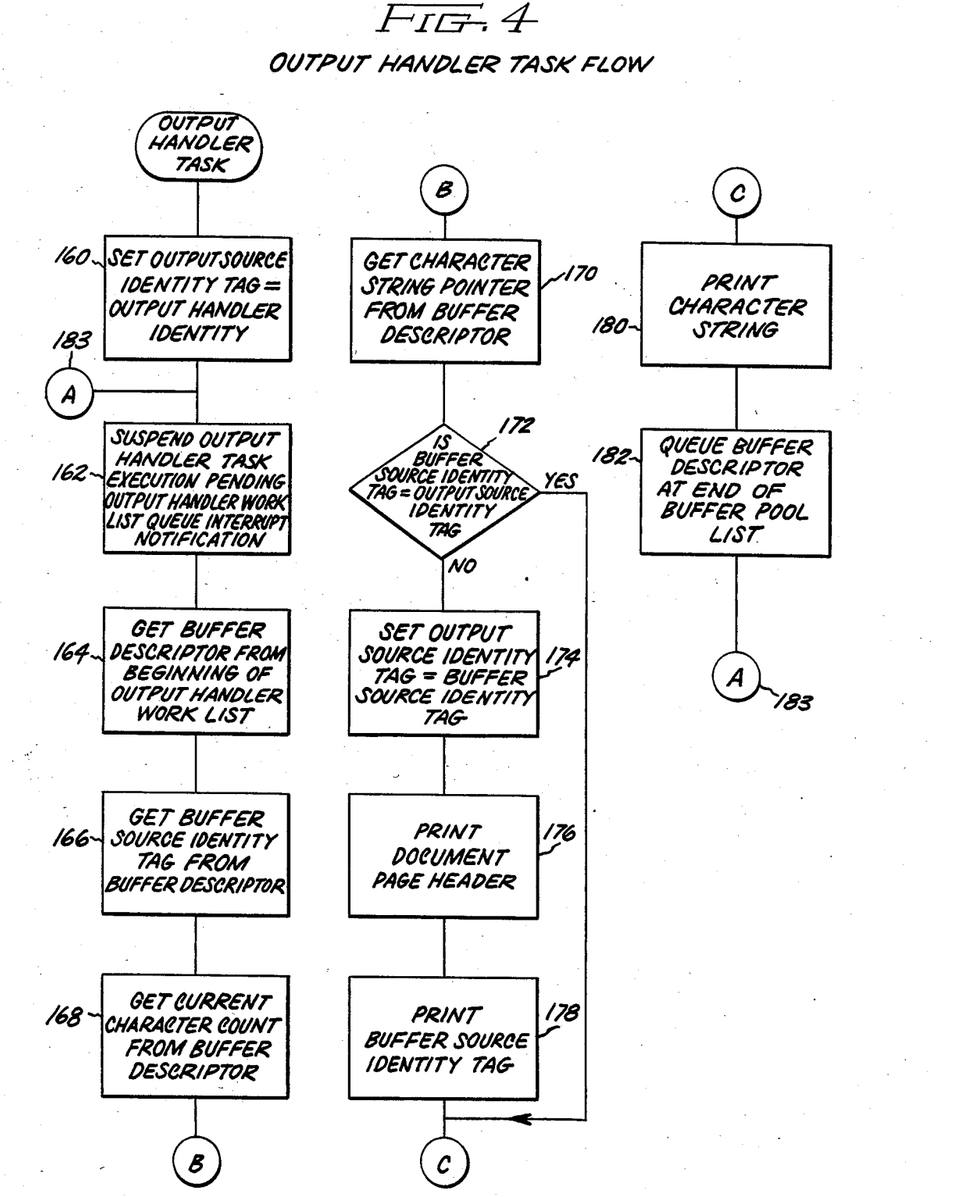
FIG. 4 illustrates an output handler task flow chart.

FIGS. 3 and 4 illustrate, in flow chart form, two different tasks which the microprocessor executes to take advantage of the faster processing capabilities.

An understanding of the input handler task is facilitated by an understanding of a representative entity the "buffer descriptor" whose contents is listed in FIG. 3a. Generally, the buffer descriptor is representaive of a discrete segment of data storage buffer area in RAM 52. The buffer descriptor includes a buffer source identity tag, a timeout period, a character count limit, a current character count, and a character string pointer. The buffer source identity tag is a segment of designated memory which retains the identity of input handler task to which the buffer is dedicated, and hence provides the identity tag corresponding to a particular turbine-generator data source. The timeout period is a segment of designated memory within which is maintained the current lapsed time for the input handler task. The lapse of time is the duration of time in which the execution of a particular input handler task has been suspended. A clearer understanding of the timeout period can be gained during the discussion of the operation of a particular input handler herein below.

The character count limit is the total number of parallelly formatted digital characters a particular data storage buffer can hold. The current character count is the particular number of parallelly formatted digital characters currently stored within a particular data storage buffer. The value of "n" shown is only illustrative of the concept and the value is not meant to be an example for the controller. The character string pointer defines the particular address of the data storage buffer area in the local RAM.

The input handler task, illustrated in FIGS. 3b, c and d, begins at step 110, FIG. 3b, by obtaining a buffer descriptor from the beginning of a buffer pool list. The buffer pool list is a queued-up plurality of buffer descriptors and each descriptor points to a queued-up plurality of empty data storage buffers in the RAM. In this manner, an empty data storage buffer is dedicated to a particular input handler task and a corresponding conversion means and data source. The buffer pool list is a linked list of buffer pool descriptors. The "linked list" concept is well known in the art. In step 112, the input handler task obtains the character count limit from the buffer descriptor. The character string pointer is then obtained from the buffer descriptor during step 114. The input handler task establishes, in the buffer descriptor's current character count, a "zero" in step 116 representative of the fact that no characters are stored in the buffer.

In step 118, the input handler task sets the timeout period in the buffer descriptor to a predetermined timeout period associated with the particular task, conversion means and data source. In the illustrated example, the timeout period is set at one second. As is well recognized in the art, the flow chart illustrates sequential steps; hence step 118 precedes step 120 and those steps are illustratively linked by the capital letters "B".

The buffer source identity tag is set equal to the input handler identity in step 120. Therefore, if input handler task A is being executed by microprocessor 50, the buffer source identity tag in the buffer descriptor would bear the identification of input handler task A, corresponding to data source A, which in turn corresponds to USART A, or conversion means 32. Step 122 suspends the execution of the input handler task. At this particular time, the microprocessor starts a timeout clock to determine the lapse of time before the next conversion interrupt notification signal.

The microprocessor resumes execution of input handler task A when either the timeout clock matched the timeout period established in the particular buffer descriptor or when an interrupt notification signal was generated by USART A signaling the conversion of a character. Since the running of the timeout clock occurs outside the input handler task A, the explanation within step 122 is illustrative of a separate timing task which occurs outside the execution of input task handler A. The suspension step 122 allows the microprocessor to utilize its faster operating rate to execute other input handler tasks or the output handler task.

Since the data arrives substantially concurrently, although on a random basis, the microprocessor establishes priorities between different tasks and between the different data sources associated with the input handler tasks. Execution of input handler task A resumes upon either the lapsed time equaling the timeout period or upon notification that USART A has converted a serial character to a parallelly formatted digital character. This latter action is evidenced by step 124. If the input handler task A has resumed execution but USART A has not produced an interrupt notification signal, input handler task A would proceed as illustrated along "E" branch 125 in FIG. 3b to execute step 148 (FIG. 3d). If input handler task A resumed execution as a result of an interrupt notification signal from USART A, step 126 involves setting the "timeout abort" memory slot for input handler task A equal to a false or negative indication.

Step 128 secures the parallelly formatted character from USART A and step 130, FIG. 3c, stores that character by placing it at the end of the character string in the dedicated data storage buffer area. Since the buffer descriptor has a character string pointer, each parallel character handled by the input handler task is placed at the end of the character string and the character string pointer is changed appropriately to point out the next available discrete, empty portion of the data storage buffer area. Step 132 increments the current character count in the buffer descriptor.

Decision block 134 compares the current character count to the character count limit in the buffer descriptor to determine whether the dedicated buffer is filled. The "no" branch leads to step 135 which sets the "buffer filled abort" memory slot of the input handler task A to false or a negative indication. The "yes"

branch from step 134 leads to step 136 wherein input handler task A sets the "buffer filled abort" memory slot equal to true or positive. Both steps 136 and 135 lead to flow point "F" 137 which ultimately brings the execution of input task handler A to decision block 138 illustrated in FIG. 3d.

Step 138 involves determining whether the "buffer filled abort" memory slot is equal to true or positive, or determining whether the "timeout abort" memory slot is equal to true or has a positive indication. In one sense, step 138 is a combined decision block but it is well recognized that only one decision need be made depending on whether input handler task A has followed flow branch "F" 137 or flow branch "E" 125 (described in detail below). The "no" branch from step 138 leads to step 139 where the "buffer ready for output" memory slot of input handler task A is set equal to false or negative. The "yes" flow branch from step 138 leads to step 140 wherein the "buffer ready for output" memory slot is set equal to true or positive.

Input handler task A then proceeds to step 142 which is a decision block to determine whether the "buffer ready for output" is equal to true. If such is the case, the "yes" branch is followed to step 144 wherein the buffer descriptor is queued at the end of the output handler work list. The output handler work list is generally similar to the buffer pool list in that it is a linked list of buffer descriptors ready to be emptied by execution of the output handler task. Again, the linking of the buffer descriptors in the output handler work list is well known in the art.

Input handler task A would then follow flow branch "A" 146 which returns back to step 110 in FIG. 3b and calls for the substitution of a new buffer descriptor thereby dedicating a new buffer descriptor and empty data storage buffer to input handler task A.

Returning to the "no" branch from step 124 of FIG. 3b, when the lapsed time equals the timeout period, input handler task A follows flow branch "E" 125 to FIG. 3d. In decision step 148, a determination is made as to whether the current character count is equal to zero, thereby signifying that no characters are stored in the data storage buffer area. If the resulting decision is "no" the appropriate branch is followed to step 149 wherein the "timeout abort" memory slot for input handler task A is set equal to true. If the decision from step 148 is "yes", input handler task A executes step 150 wherein the "timeout abort" memory slot is set equal to false. Input handler task A would then execute step 138, which follows both steps 150 and 149.

If flow branch "E" 125 is followed, the decision in step 138 relates to whether the "timeout abort" is equal to true or false. If the "timeout abort" is equal to true, the "yes" branch is followed to step 140 where the "buffer ready for output" is set equal to true. Step 142 determines whether the "buffer ready for output" is equal to true. Hence, when a timeout period has lapsed, a partially filled buffer is presented to the output handler work list to be emptied on an equal basis with the filled buffers. If the "buffer ready for output" memory slot is not equal to true, the "no" flow branch is followed along path "C" 151 from FIG. 3d to FIG. 3b and to step 122, which is the suspension of the task pending either an interrupt notification signal by USART A or the appropriate timeout period lapse.

FIG. 4 illustrates the output handler task flow chart. The output handler task begins by initializing, in step 160, and setting the "output source identity tag" memory equal to "output handler identity". Step 162 suspends the execution of the output handler task pending an interrupt notification signal by the output handler work list queue. In other words, the further execution of the output handler task is suspended unless there is a buffer descriptor queued up at the output handler work list queue ready to be emptied. If several buffers are queued-up, they are handled on a first-come, first-served basis. In step 164, the buffer descriptor is obtained from the beginning of the output handler work list. Step 166 secures the buffer source identity tag from the buffer descriptor. Step 168 obtains the current character count from the buffer descriptor. Step 170 involves obtaining the character string pointer from the buffer descriptor which allows the output handler task to find the data storage buffer area in the RAM.

The output handler task then executes decision step 172 wherein a determination is made whether the buffer source identity tag is equal to the output source identity tag. The buffer source identity tag would be equal to the output source identity tag when either the output handler task has been interrupted, as will be explained subsequently herein, when two buffer descriptors from the same data source are processed sequentially, or when the output handler task has been called into action for the first time. If the decision in step 172 leads to the "yes" branch, the character string would be printed as in step 180. If the decision from step 172 is "no", step 174 sets the output source identity tag equal to the buffer source identity tag.

Step 176 commands the task to print a document page header in cooperation with USART O, network 58 and logger 60. In step 178, the buffer source identity tag character(s) is printed which identifies the particular data source generating the discrete amount of information stored within the buffer now being handled by the output handler task. The output handler task executes step 180 wherein the buffer is emptied through the USART O by supplying the character string of the parallelly formatted digital characters to USART O and ultimately to the line printer. The buffer is emptied on a first-come, first-served basis with respect to the characters stored therein. It is well known in the art that step 180 includes decrementing the current character count when each character is printed and determining when the entire contents of the buffer has been emptied into USART O. The output handler task then executes step 182 wherein the buffer descriptor is queued or returned to the end of the buffer pool list. Lastly, the output handler task follows branch "A" 183 which returns the task back to suspension step 162.

Figure 5:
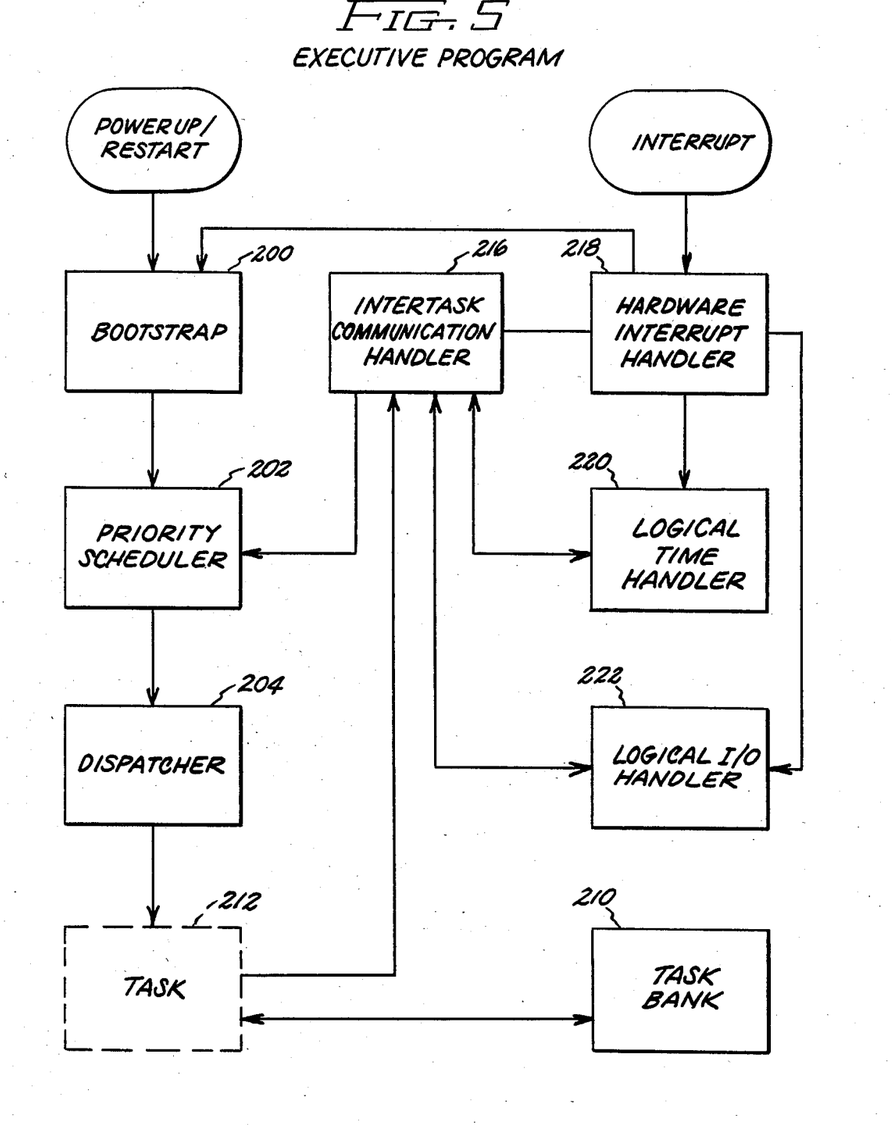
FIG. 5 illustrates an executive program flow chart.

Briefly stated, the microprocessor may interrupt any input handler task in favor of another input handler task and may also interrupt the output handler task at any point within the execution of that latter task. To fully appreciate this aspect of the shared data logger controller, the executive program flow chart is illustrated in FIG. 5. At the time the system is powered up, a bootstrap routine, step 200, is executed by the microprocessor. The bootstrap defines the priority of each task and its corresponding conversion means or USART. The priority is based upon the criticality of the information handled by each input handler task which corresponds to the degree priority or importance of each particular data source. In this invention, the output handler task has the lowest priority with respect to all other tasks. Each input handler task has an assigned degree of priority so the microprocessor will handle the data efficiently and will be able to determine which task to execute if two interrupt notification signals are noted simultaneously on the appropriate bus.

In this example, the data sources generating the higher rates of transmission are given higher degrees of priority. Specifically, data supplied through line 14 at 120 cps (in FIG. 1) sent by display and communications computer 12 is given the highest degree of priority; hence, input handler task A, corresponding to USART A, has the top priority and that task will be executed in favor of any other task currently being executed by the microprocessor. Input handler task A is executed whenever USART A produces an interrupt type notification signal or the lapsed time on the timeout clock for input handler task A equals the task's predetermined timeout period.

The next highest priority has been assigned to turbine bypass control system computer 26 which transmits serial streams of data at 120 cps. Increasingly lesser degrees of priority are given to line 16 extending between display and communications computer 12 and USART B, line 20 from input calculations computer 18 and USART C, and lastly, from control computer 22 and to USART D. In summary, the relative priority of the various tasks are: input handler task A, input handler task E, input handler task B, input handler task C, input handler task D, and output handler task.

Bootstrap step 200 would initialize the microprocessor by assigning the relative degrees of priority to the tasks as described above. Also, step 200 would initialize the condition of all the hardware by clearing the control, address, and data busses and establishing any hardware priority interrupt conditions necessary for the proper operation of the shared data logger controller.

Step 202, the priority scheduler, looks at each task which is "ready to be executed" and picks the task which is assigned the highest degree of priority. During the initialization of the system, input handler task A would be executed from step 110, the obtaining of the buffer descriptor, until step 122, the suspension of the input handler task pending some type of interrupt notification signal. The microprocessor would then execute the same steps for input handler task E since that task has the next highest priority level until input handler task E has been suspended. The initial execution of the remaining tasks would follow.

Step 204 in the executive program flow chart of FIG. 5, is a dispatcher which restores the operating system to a condition such that the task, which is to be executed, has been restored to the condition it was in when the task was interrupted in favor of a higher priority task. Also, step 204 secures from task bank 210 the particular task to be executed during step 212.

Intertask communication handler, step 216, provides the multitasking operation for the microprocessor which is well known in the art. The intertask communication handler provides an interface for the timeout periods, the interrupt signals from the USARTs and interrupt signals from other devices. The intertask communication handler also takes off the "suspended list" selected tasks which have received some type of interrupt notification signals and puts those tasks on the "ready to be executed list". Hardware interrupt 218 provides an interface between the clock pulses put out by a device external to the microprocessor, provides an interface between the interrupt notification control signals from the USARTs, signifying that a parallelly formatted digital character has been converted, and interfaces between other hardware sending out similar interrupt signals which must be relayed to the intertask communication handler. Logical time handler 220 keeps track of the lapsed time and the timeout clocks for the various input handler tasks. As illustrated in FIG. 5, logical time handler 220 interacts with intertask communication handler 216 and also is tied to hardware interrupt handler 218.

Logical input/output handler 222, labeled in FIG. 5 as "Logical I/O Handler," handles the USART interrupt notification signals and interreacts between those USARTs and the intertask communication handler 216.

Since an objective of the shared data logger controller is to process the flow of data from a number of substantially independent data sources which flow could be received by the controller relatively simultaneously, the controller must establish some priority system and some type of interrupt system to preserve the integrity of the data streams from the various devices. This feature allows the shared data logger controller to handle different rates of transmission from different data sources, as well as different quantities of information from data sources.

As an example and referring to FIG. 1, assume computer 18 is sending a burst of data across line 20 to isolation network 38. Each serially formatted character is converted by USART C into a parallelly formatted digital character. After USART C fully converts a character, the USART C places a signal on control bus 62 which is recognized by microprocesser 50 through its executive program. Assuming no other task is being executed at that time, input handler task C begins execution at step 124 (FIG. 3b) and proceeds as described hereinabove. The timeout clock for input handler task C is stopped during the execution of input handler task C.

In this example, assume that when input handler task C reaches step 138 (FIG. 3d), computer 12 has sent a burst of data of which USART A has converted at least one digital character. At that point in time, USART A puts an interrupt notification control signal on control bus 62 notifying the microprocessor through its executive program, of its condition. The microprocessor recognizes that USART A has higher priority than USART C and, in turn, input handler task A has higher priority than input handler task C. Thereafter, step 138 (FIG. 3d) of task C is halted in favor of executing task A at step 124 (FIG. 3b). The microprocessor, through intertask communication handler 216 (FIG. 5) and related multitasking programming, remembers the status of input handler task C's at its last point of execution. Thereafter, task A is executed to up to step 122 (FIG. 3b) wherein the task is suspended, pending the full conversion of the next character.

At that point in time, the microprocessor takes input handler task C off of its "ready to execute list", places input handler task C in executive program step 212 (FIG. 5), restores task C to its condition prior to interruption, and resumes execution of that task at step 138 (FIG. 3d) where the task had been interrupted by the higher priority task. In this sense, all tasks are executed in accordance with their priority and the priorities are utilized to resolve conflicts between tasks.

There is a twofold purpose for assigning degrees of priority between the various USARTs tied to corresponding data sources. The major reason for assigning priorities is to avoid a deadlock when two tasks need to be executed at substantially the same time. However, the second reason for assigning priorities is to ensure that the data streams, which are transmitted at a higher rate of transmission, are handled quicker. The preservation of data is essential. Since their relative transmission rates are higher, tasks A and E would normally be executed more often than input handler tasks B, C, and D. The output handler task has been assigned the lowest priority because to preserve the information therein would only require increasing the amount of memory in local RAM 52.

In one embodiment, the shared data logger controller has two buffer pool lists or two queued-up pluralities of empty data storage buffers. The second buffer pool list or second queued-up plurality of data storage buffers includes buffers of longer length, i.e., more data storage memory space, than the first queue of buffers. This second buffer pool list is utilized for data streams which are received at a faster rate of transmission. The output task can accommodate the overall data flow in a more efficient manner, with two buffer pools.

The particular size of RAM or random access memory available to each particular buffer or buffer descriptor, can be tailored to hold the estimated amount of data per discrete data burst from a particular data source. Therefore, if a turbine-generator operating system sends approximately 300 characters per burst of data to the shared data logger controller along one data line, each buffer could have enough memory assigned to it to hold those 300 characters. In this fashion, the execution of the output handler task is optimized.

In a similar fashion, the timeout periods can be tailor-made for a specific data source application. If the data sources tied into the controller generate too much data overall for the controller to handle, memory buffers, such as shift registers, a faster computer or a customized communications microcomputer may be utilized to accomplish the objects herein.

The claims appended to this specification are meant to cover all modifications and equivalents apparent to those of ordinary skill in the art. It is to be understood that the rates of transmission from the various turbine-generator operating data sources, as well as the designation of which data sources will be tied into the shared data logic logger controller are exemplary, and as such, they are not meant to limit the scope of the appended claims. Also, it is recognized that the microprocessor may be combined with the local RAM and local ROM into a central processing unit; hence, the hardware architecture illustrated in FIG. 1 is only illustrative of the discrete functional portions of such an apparatus.

What is claimed is:

1. A method for channeling the flow of data from a plurality of turbine-generator data sources to a single data logger for printing a record of the data, each data source for generating a discrete burst of serially formated digital data representative of a respective operating condition of a turbine-generator, each discrete burst including at least one character, said data logger for printing the record in response to a single stream of serially formatted digital data including at least one character, which method comprises the steps of:
   independently converting the serially formatted digital data from each of the plurality of turbine-generator data sources into respective parallelly formatted digital data;
   assigning a respective predetermined priority to the serially formatted digital data from each data source;
   storing the respective converted character so long as all converted characters from the respective serially formatted data having a higher priority have been stored, in a respective first data storage buffer having a respective first predetermined data storage capacity;
   storing the respective converted character so long as all converted characters from the respective serially formatted data having a higher priority have been stored, in a respective second data storage buffer having a second predetermned data storage capacity, after the first predetermined data storage capacity of the respective first data storage buffer has been filled; and
   supplying the contents of a filled data storage buffer to said data logger to form at least part of the single stream of serially formatted digital data, so long as all converted characters have been stored.

2. The method as in claim 1, further including the step of:
   storing at least one identification character in each respective first data storage buffer, wherein the at least one identification character identifies the particular turbine-generator data source generating the data to be stored in the respective first data storage buffer.

3. The method as in claim 2, further comprising the steps of:
   establishing a respective predetermined timeout period for converting for each corresponding data source;
   determining the respective interval between storing and converting the next respective serially formatted digital character from the corresponding data source; and
   supplying the contents of any partially full data storage buffer corresponding to the data source whose respective interval has exceeded its respective predetermined timeout period to said data logger to form at least another part of the single stream of serially formatted digital data, so long as all converted characters have been stored.

4. The method as in claim 3, wherein the step of converting is executed substantially concurrently with respect to all other steps and further wherein the steps of storing and supplying the contents of any partially full data storage buffer are executed relatively independently.

5. The method as in claim 1, wherein at least one of the plurality of turbine-generator data sources has a higher data transmission rate than another of the plurality of data sources and further wherein the priority of the serially formatted digital data from the at least one of the plurality of turbine-generator data sources is higher than the priority of the serially formatted digital data from all data sources having a lower data transmission rate than the at least one data source.

6. The method as in claim 1, wherein supplying includes providing the contents of filled data storage buffers to said data logger on a first-filled first-provided basis regardless of the priority of the serially formatted digital data which is represented by the contents of the filled data storage buffer.

7. The method as in claim 6, wherein the step of supplying the contents of any partially full data storage buffer includes providing the contents of any partially full data storage buffer to said data logger, wherein the partially full data storage buffer is supplied equally with the filled data storage buffers based on when filled for full data storage buffers and when the respective interval exceeds the respective timeout period for partially full data storage buffers.

8. The method as in claim 1, wherein the steps of storing are performed for the respective serially formatted digital data that has been converted having the highest priority and execution of the steps of storing for the respective serially formatted digital data having lower priorities is suspended until the steps of storing for the respective serially formatted digital data that has been converted having the highest priority are executed.

9. A shared data logger controller for channeling flow of data from a plurality of turbine-generator data sources into a single data logger for printing a record of said data, each turbine-generator data source for generating discrete bursts of serially formatted data representative of a respective operating condition of a turbine-generator, each discrete burst including at least one character and serially formatted data from each data source assigned a respective predetermined priority, said data logger for printing the record in response to a single stream of serially formatted digital data, comprising:

a plurality of input conversion means, each input conversion means having an input coupled to a respective utput of one of the plurality of turbine-generator data sources and an output, each input conversion means for converting discrete bursts of serially formatted data received from the corresponding data source into parallelly formatted data at its output and signaling the completion of each conversion a plurality of data storage buffers, said data storage buffers predeterminedly arranged in a linked list to form a queue;

output conversion means having an input coupled to each of the plurality of data storage buffers, the output conversion means for converting parallelly formatted digital data available from the plurality of data storage buffers to corresponding serially formatted digital data for forming at least a part of the stream of serially formatted digital data, said output conversion means having an output coupled to an input of said data logger for supplyiing the single stream of serially formatted digital data to said data logger; and a microprocessor coupled to each of said plurality of data storage buffers, to each of said plurality of input conversion means and to said output conversion means, said microprocessor for controlling flow of data from each of the plurality of data sources by directing each converted character to be stored in a respective first data storage buffer so long as all converted characters from the respective serially formatted data having a higher priority have been stored, the respective first data storage buffer corresponding to the respective input conversion means, by directing each converted character to be stored in a respective second data storage buffer when the respective first data storage buffer is filled with converted digital characters from a corresponding input conversion means so long as all converted characters from the respective serially formatted data having a higher priority have been stored, and by ordering the contents of filled data storage buffers to the input of said output conversion means.

10. The shared data logger as in claim 9, wherein at least one of the plurality of data sources has a higher transmission rate than another of the plurality of data sources and further wherein data from the at least one of the plurality of data sources has a higher priority than data from the another of the plurality of data sources.

11. The shared data logger as in claim 9, wherein the contents of partially filled data storage buffers is directed to the input of said output conversion means after a respective predetermined interval during which no data is stored in the respective partially filled data storage buffer.

* * * * *